(12) United States Patent
Fox

(10) Patent No.: US 9,546,722 B2
(45) Date of Patent: Jan. 17, 2017

(54) CLUTCH SYSTEM

(71) Applicant: Eaton Corporation, Cleveland, OH (US)

(72) Inventor: Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 62 days.

(21) Appl. No.: 14/566,684

(22) Filed: Dec. 10, 2014

(65) Prior Publication Data

US 2015/0119181 A1    Apr. 30, 2015

Related U.S. Application Data

(63) Continuation of application No. PCT/US2013/031080, filed on Mar. 13, 2013.

(51) Int. Cl.
*F16H 48/20* (2012.01)
*B60K 1/00* (2006.01)
*F16H 48/22* (2006.01)
*F16H 48/08* (2006.01)

(52) U.S. Cl.
CPC .............. *F16H 48/22* (2013.01); *B60K 1/00* (2013.01); *F16H 48/08* (2013.01); *B60K 2001/001* (2013.01)

(58) Field of Classification Search
CPC ............ F16H 48/08; F16H 48/22; B60K 1/00; B60K 2001/001
See application file for complete search history.

(56) References Cited

U.S. PATENT DOCUMENTS

| 5,092,825 | A | 3/1992 | Goscenski, Jr. et al. |
| 5,819,883 | A | 10/1998 | Organek et al. |
| 7,549,940 | B2 | 6/2009 | Kira et al. |
| 7,762,366 | B2 | 7/2010 | Janson |

(Continued)

FOREIGN PATENT DOCUMENTS

| DE | 102004058984 | 6/2006 |
| DE | 102010024580 | 12/2011 |

OTHER PUBLICATIONS

International Search Report and the Written Opinion for International application PCT/US2013/031080 dated Jun. 19, 2013 (11 pages).

*Primary Examiner* — Justin Holmes
*Assistant Examiner* — Lillian Nguyen
(74) *Attorney, Agent, or Firm* — Dierker & Kavanaugh, P.C.

(57) ABSTRACT

A clutch system selectably connects a vehicle rear axle to a motor. The clutch system includes an intermediate shaft to fixably attach to a side gear of a differential for rotation therewith. A case of the differential is connected to the motor via a gear train. Another side gear of the differential is affixed to an output shaft, and the output shaft extends through a center of rotation of an armature of the motor to connect to a road wheel of a vehicle. A clutch is to selectably connect the intermediate shaft to another output shaft connected to another road wheel of the vehicle. An actuator is to actuate the clutch to an engaged state and thereby selectably connect the intermediate shaft to the other output shaft. The output shaft, the other output shaft, and the motor rotate independently when the clutch is not in the engaged state.

13 Claims, 8 Drawing Sheets

(56) References Cited

U.S. PATENT DOCUMENTS

| | | | |
|---|---|---|---|
| 9,057,430 B2* | 6/2015 | Horaguchi | B60K 17/3515 180/233 |
| 2002/0023816 A1* | 2/2002 | Organek | F16D 27/115 192/35 |
| 2003/0209398 A1 | 11/2003 | Organek et al. | |
| 2007/0023211 A1 | 2/2007 | Keller et al. | |
| 2007/0093344 A1* | 4/2007 | Kira | B60K 6/36 475/150 |
| 2010/0219036 A1* | 9/2010 | Uchida | F16D 27/115 192/84.91 |
| 2011/0275470 A1* | 11/2011 | Ekonen | B60K 17/35 475/198 |
| 2012/0219435 A1* | 8/2012 | Frait | F16D 48/0206 417/410.1 |
| 2012/0238394 A1* | 9/2012 | Valente | B60K 17/346 475/221 |
| 2015/0141192 A1* | 5/2015 | Valente | F16H 57/0404 475/160 |

\* cited by examiner

CLUTCH SYSTEM

CROSS-REFERENCE TO RELATED APPLICATIONS

This application is a continuation of International Application S.N. PCT/US2013/031080, filed Mar. 13, 2013, which itself claims the benefit of U.S. Provisional Application Ser. No. 61/669,275, filed Jul. 9, 2012, which is incorporated by reference herein in its entirety.

BACKGROUND

In some vehicles, an electric motor is used to selectably drive the rear wheels while another power source, for example an internal combustion engine, drives the front wheels.

SUMMARY

An example of the clutch system disclosed herein selectably connects a vehicle rear axle to a motor. The clutch system includes an intermediate shaft to fixably attach to a side gear of a differential for rotation therewith. A case of the differential is connected to the motor via a gear train. Another side gear of the differential is affixed to an output shaft, and the output shaft extends through a center of rotation of an armature of the motor to connect to a road wheel of a vehicle. A clutch is to selectably connect the intermediate shaft to another output shaft connected to another road wheel of the vehicle. An actuator is to actuate the clutch to an engaged state and thereby selectably connect the intermediate shaft to the other output shaft. The output shaft, the other output shaft, and the motor rotate independently when the clutch is not in the engaged state.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in conjunction with other drawings in which they appear.

DETAILED DESCRIPTION

In some hybrid vehicles, an electric motor may provide power to the drive wheels in conjunction with an internal combustion engine.

Examples according to the present disclosure provide electric clutch capability for powertrain components. For example, a clutch system as disclosed herein may provide an axle shaft disconnect for a powered rear axle in a vehicle. In an example, a vehicle may have an electric drive rear axle and an internal combustion engine driven front wheels with no prop shaft from the internal combustion engine to the rear axle. A clutch may be included to allow the rear wheels to be disconnected from the electric motor in a freewheeling state. In another example, there may be a prop shaft connecting the internal combustion engine to the rear axle. A clutch may be included to allow the prop shaft to be selectably disconnected from the rear axle.

Figure 1A:
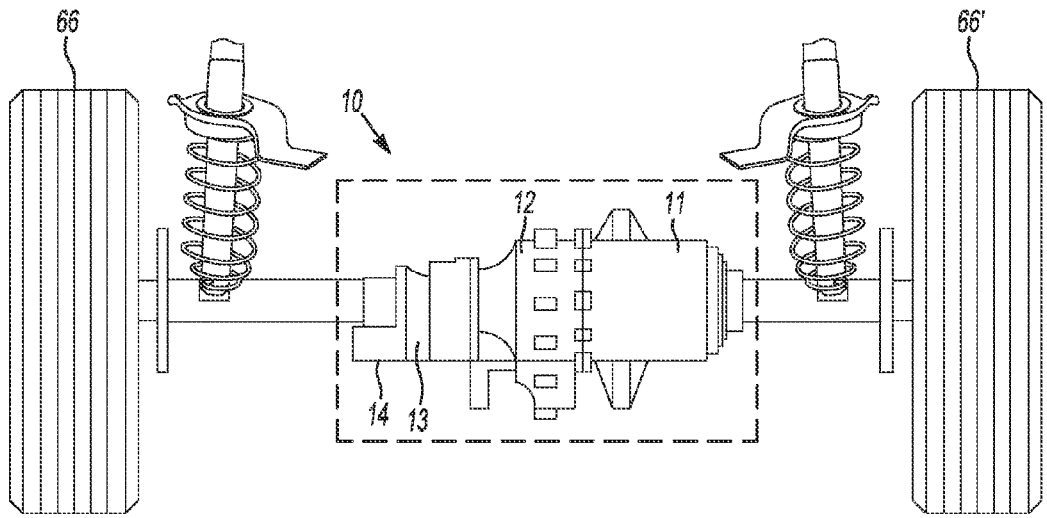
FIG. 1A is a semi-schematic perspective partial view of an example of a drive system in a vehicle according to the present disclosure.

Referring now to FIG. 1A, an example drive system 10 is provided in a vehicle as indicated by connection to road wheels 66 and 66'. Drive system 10 is depicted in FIG. 1A as components within the dashed line box including motor 11, transmission/differential assembly 12, and clutch assembly 13 (with hydraulic pump-motor 14). Motor 11 provides driving power to the road wheels 66 and 66' through the transmission-differential assembly 12 which will be described in further detail below.

Figure 1B:
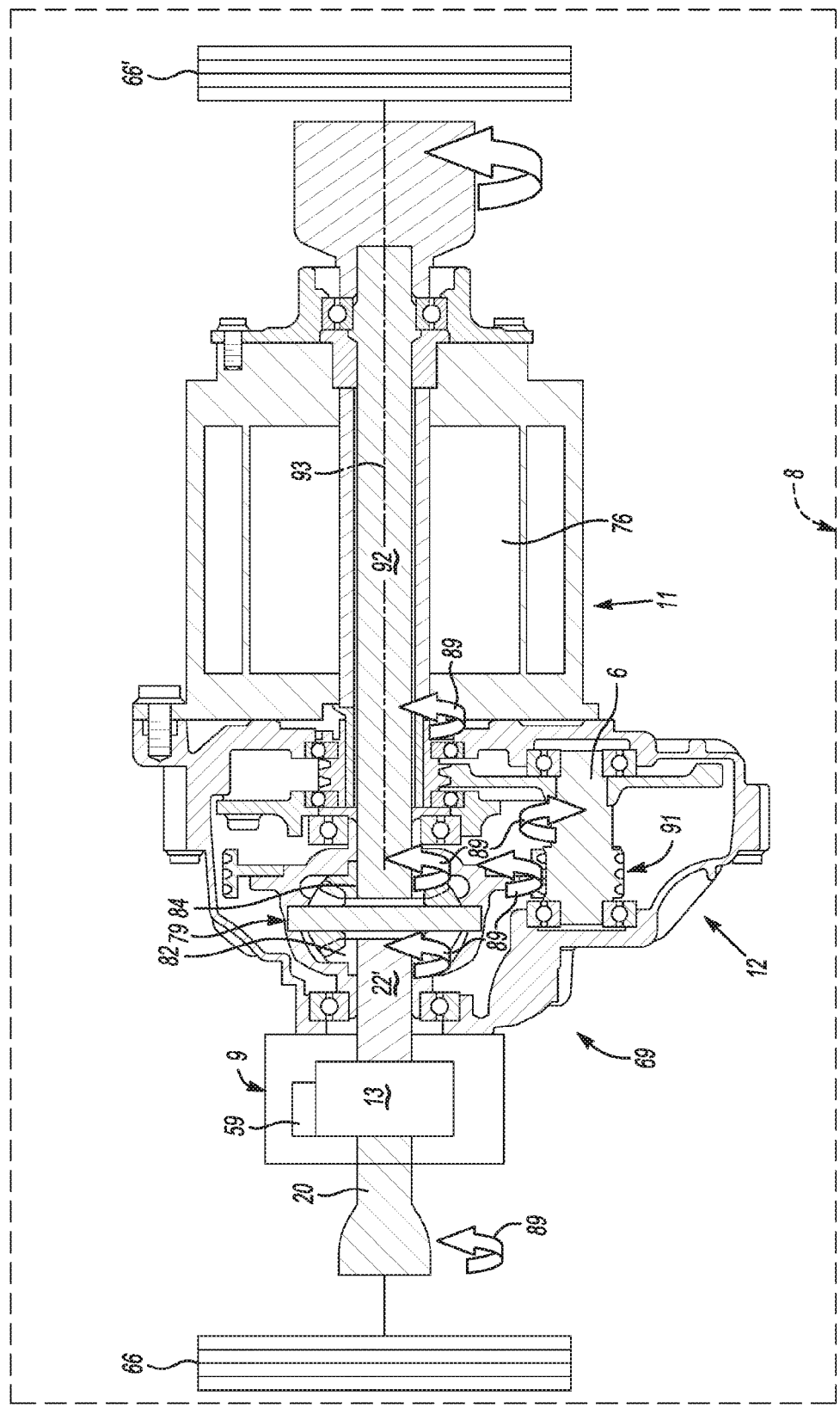
FIG. 1B is a semi-schematic cross-section view of a rear axle according to the present disclosure.

FIG. 1B schematically depicts a clutch system 9 to selectably connect a vehicle rear axle 69 to a motor 11. Motor 11 may be an electric motor. The clutch system 9 includes an intermediate shaft 22 to fixably attach to a side gear 82 of a differential 79 for rotation therewith. A case 80 of the differential 79 is connected to the motor 11 via a gear train 91. Another side gear 84 of the differential 79 is affixed to an output shaft 92. The output shaft 92 extends through an armature 76 of the motor 11 along a center of rotation 93 of the armature 76 to connect to a road wheel 66' of the vehicle 8. The clutch system 9 further includes a clutch 13 to selectably connect the intermediate shaft 22 to another output shaft 20. The other output shaft 20 is connected to another road wheel 66 of the vehicle 8. An actuator 59 is included in the clutch system 9 to selectably actuate the clutch 13 to an engaged state. The actuator 59 may be defined within the clutch 13 or connected to the clutch 13 to selectably actuate the clutch 13. By selectably actuating the clutch 13 to the engaged state, the actuator 59 selectably connects the intermediate shaft 22 to the other output shaft 20. The clutch 13 is shown in the engaged state in FIG. 1B as indicated by rotation direction arrows 89. The rotation direction arrows 89 do not imply that the differential 79 is locked. The differential 79 shown in FIG. 1B is operative. As such, the output shaft 92 and the other output shaft 20 may turn at different rates to accommodate the vehicle 8 driving on a curved path while rotational power is applied from the motor 11. When the clutch 13 is not in the engaged state, the output shaft 92, the other output shaft 20, and the motor 11 rotate independently. As such, rotational power does not flow from the motor 11 to either the output shaft 92 or the other output shaft 20 when the clutch 13 is not in the engaged state.

Figure 1C:
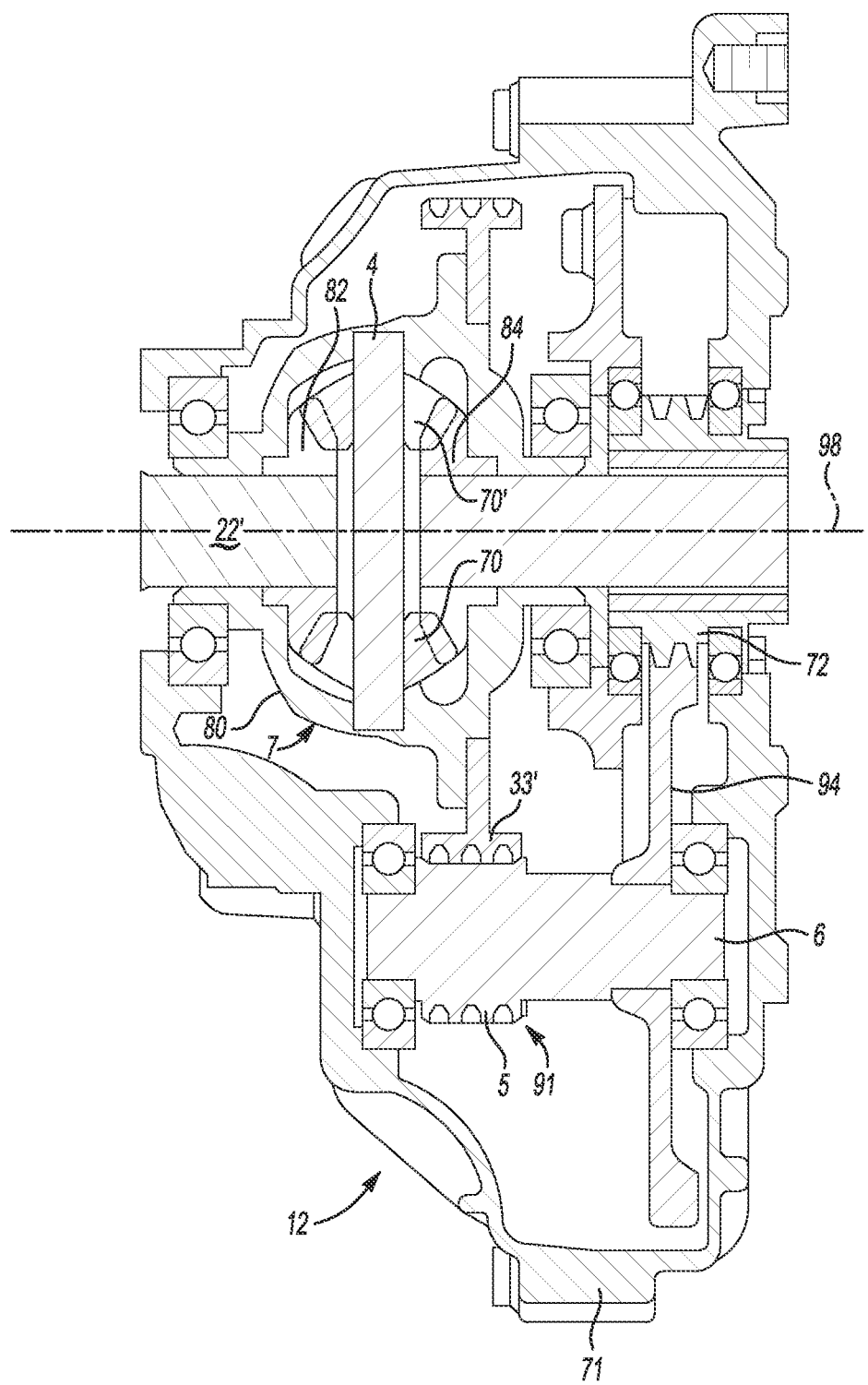
FIG. 1C is a semi-schematic cross-section view of a transmission-differential according to the present disclosure.

FIG. 1C depicts a transmission-differential assembly 12 according to the present disclosure. A differential assembly 7 is disposed in the transmission-differential housing 12. The differential assembly 7 includes a differential case 80 to rotate about an axis of rotation 98. The differential case 80 retains side gears 82 and 84 which cooperate with each other via pinion gears 70 and 70'. Pinion gears 70 and 70' rotate within the differential case 80 on a differential pinion shaft 4 to allow for relative rotation between side gears 82 and 84.

A ring gear 33' is fixed to the differential case 80 to rotate coaxially therewith. A reducing gear 94 is intermeshed with an electric drive motor output pinion 72. The reducing gear 94 has a pitch diameter that is larger than the pitch diameter of the electric drive motor output pinion 72. A layshaft 6 is fixed to the reducing gear 94 for rotation therewith. A layshaft pinion 5 is fixed to the layshaft 6 for rotation therewith. The layshaft pinion 5 has a pitch diameter that is smaller than the pitch diameter of the reducing gear 94. The layshaft pinion 5 is meshingly engaged with the ring gear 33'. The pitch diameter of the layshaft pinion 5 is smaller than the pitch diameter of the ring gear 33'. The electric drive motor output pinion 72, the reducing gear 94, layshaft 6, layshaft pinion 5, and ring gear 33' together form an example of a gear train 91 according to the present disclosure. It is to be understood that other gear trains 91 may be used to achieve desired gear reductions between the motor 11 and the differential case 80. For example, planetary gears (not shown) may be included in the gear train 91.

Figure 2:
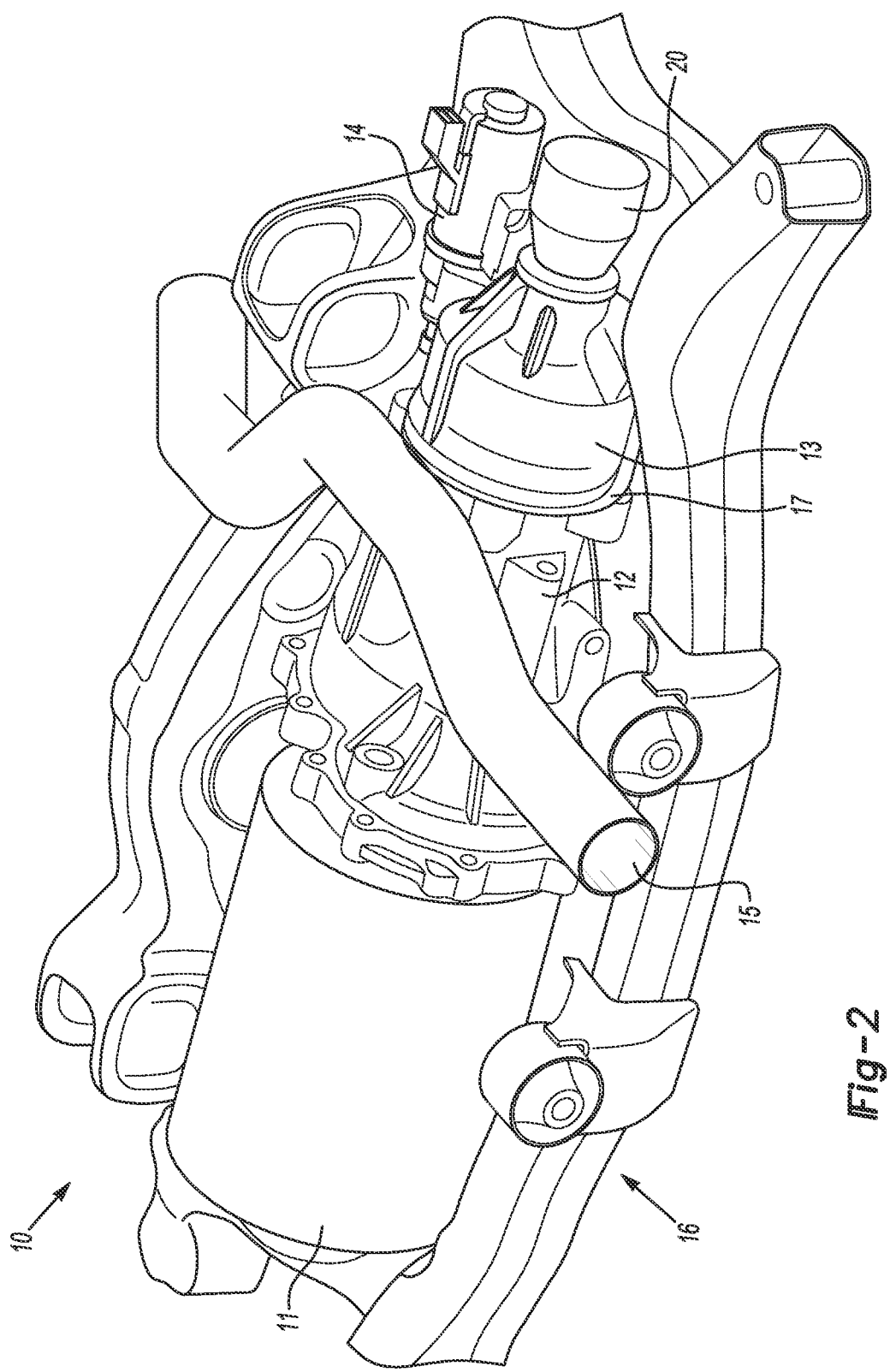
FIG. 2. is a semi-schematic front perspective view of an example of a clutch assembly installed in a vehicle subframe according to an example of the present disclosure.

FIG. 2 depicts a portion of a vehicle with an example drive system 10 including vehicle sub-frame 16, and exhaust pipe 15. Electric motor 11 is connected to transmission-differential 12, which is connected to a clutch housing 17 of clutch assembly 13. An output shaft 92 (see FIG. 1B) extends out of the electric motor 11. Another output shaft 20 extends opposite to the output shaft 92, and is shown having a constant velocity (CV) joint and boot cover. A hydraulic pump-motor 14 is shown connected to the clutch assembly 13.

Figure 3:
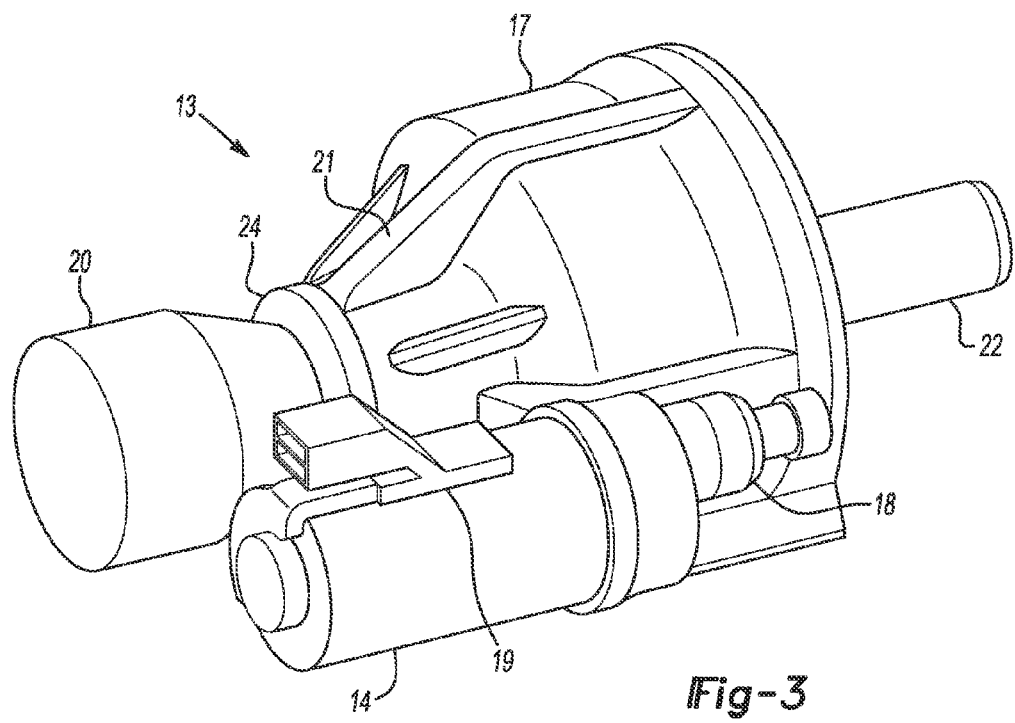
FIG. 3 is a semi-schematic rear perspective view of an example of a clutch assembly according to an example of the present disclosure.

FIG. 3 depicts a more detailed external view of an example of a clutch assembly 13. Hydraulic pump-motor 14 is fixedly attached to clutch assembly 13. Clutch housing 17 encloses internal components of clutch assembly 13. The hydraulic pump-motor 14 is in fluid connection with an annular hydraulic cylinder 34 (see FIG. 4) to selectably pressurize a hydraulic fluid in the annular hydraulic cylinder 34. Structural ribs including structural rib 21 may be defined in the clutch housing 17 to provide stiffness and support. Dust cover 24 protects clutch assembly 13 internal components by substantially excluding external contaminants such as dust, road debris, etc. Electrical connector 19 provides power from an electrical supply (not shown) to the clutch assembly 13. Electrical connector 19 may also connect electrical control circuits to an electronic controller (not shown). A temperature and pressure sensor assembly 18 may be attached to hydraulic pump-motor 14. Temperature and pressure information from the temperature and pressure sensor assembly 18 may be used in controlling the hydraulic pump-motor 14. An intermediate shaft 22 extends axially from the clutch housing 17. The other output shaft 20 extends axially from the clutch housing 17 opposite to the intermediate shaft 22.

The clutch assembly 13 may normally operate at low pressures (e.g., about 200 psi) so as to minimize energy usage. In examples, the hydraulic pressure may range from about 50 psi to about 500 psi.

In an example of clutch assembly 13 of the present disclosure, the wiring for the clutch assembly 13 may include from 7 to 8 conductors for a brushless direct current (BLDC) motor, and 4 conductors for the pressure and temperature sensor assembly 19. In other examples, a 12V (Volt) standard DC motor may be used rather than the BLDC motor. The BLDC motor may have a shorter response time than the 12 VDC motor.

Figure 4:
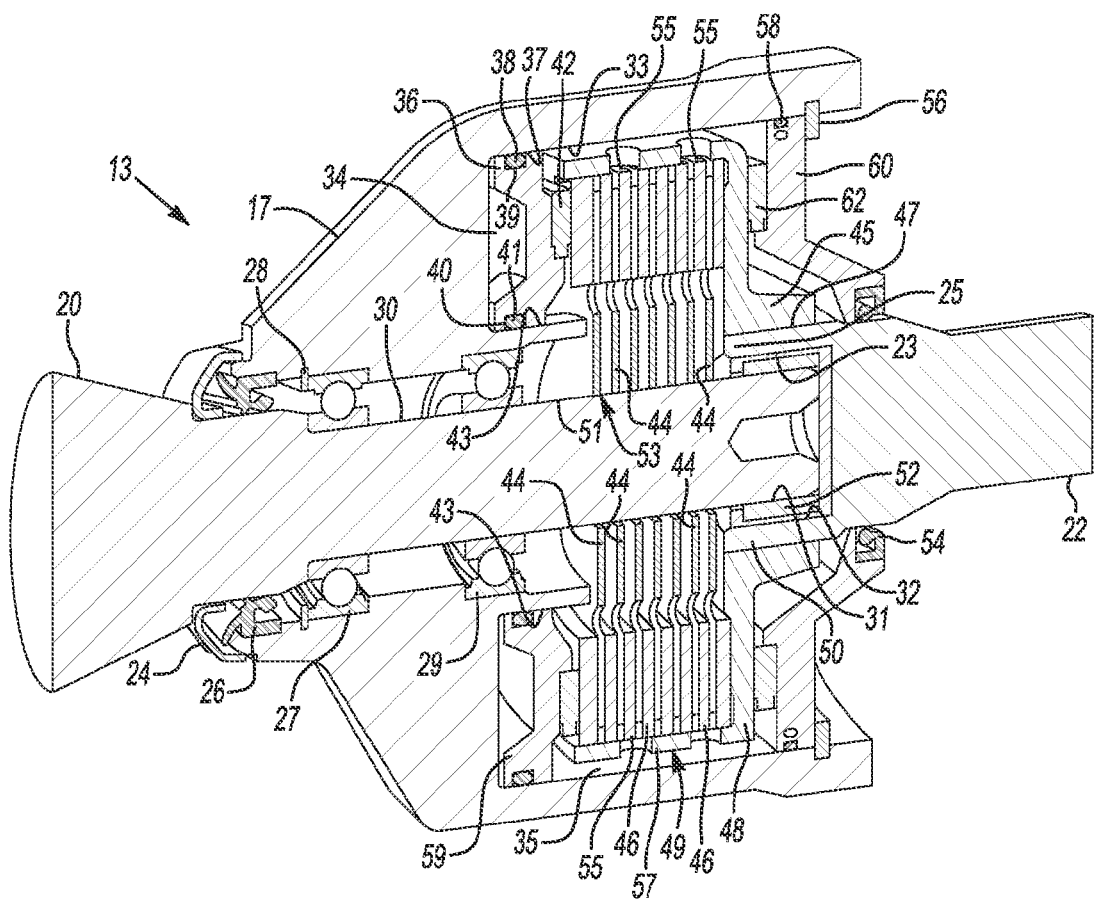
FIG. 4 is a cross-sectional view of the example of the clutch assembly depicted in FIG. 3 according to an example of the present disclosure.

FIG. 4 depicts a cross-sectional view of an example of a clutch assembly 13 according to the present disclosure. The clutch assembly 13 provides a shaft disconnect function from intermediate shaft 22 to the other output shaft 20. Clutch assembly 13 is a closed system, meaning seals enclose the system which contains its own hydraulic fluid inside. Dust cover 24 cooperates with rotating output shaft 20 to exclude larger contaminants from internal components of clutch assembly 13. Output shaft lip seal 26 seals the rotatable other output shaft 20 thereby excluding external contaminants and retaining the hydraulic fluid inside of the clutch assembly 13. The other output shaft 20 is supported in the clutch housing 17 on shaft section 30 by an outer ball bearing 27 and an inner ball bearing 29 to support the other output shaft 20 for rotation relative to the clutch housing. Outer bearing 27 is retained by snap ring 28 within clutch housing 17. An interior end of the other output shaft 20 is nested in a cylindrical pocket 23 defined at a clutch end 25 of the intermediate shaft 22. A roller bearing 52 is disposed between an outer circumferential surface 31 of the other output shaft 20 and an interior surface 32 of the cylindrical pocket 23 to support the other output shaft 20. Intermediate shaft 22 is arranged to rotate along the same axis as the other output shaft 20 and is supported by the roller bearing 52 for coaxial selectably independent rotation with the intermediate shaft 22.

In the example of the present disclosure depicted in FIG. 4, a multiplate clutch pack 49 is rotatably disposed in the clutch housing 17. The multiplate clutch pack 49 includes a clutch pack housing 48. Clutch pack housing 48 is fixedly attached, for example by a spline joint for rotation with intermediate shaft 22 at intermediate shaft hub 50. In an example, the clutch pack housing 48 has a clutch pack housing hub 45 with a first splined connection 47 to the intermediate shaft 22.

A plurality of first clutch plates 44 and second clutch plates 46 are stacked in alternating sequence in the clutch pack housing 48. The plurality of first clutch plates 44 has internal engagement features 51 to engage the other output shaft 20 with a second splined connection 53. The plurality of second clutch plates 46 has external engagement features 55 to engage the clutch pack housing 48 by a third splined connection 57.

An annular hydraulic cylinder 34 is defined in the clutch housing 17 surrounding the other output shaft 20. An annular hydraulic piston 36 is slidingly disposed in the annular hydraulic cylinder 34. The annular hydraulic piston 36 is connected axially to the multiplate clutch pack 49 to selectably generate a clutch engaging force on the multiplate clutch pack 49. As such, the annular hydraulic piston 36 is the actuator 59 that selectably actuates the clutch assembly 13 to an engaged state. In the engaged state, the intermediate shaft 22 is connected to the other output shaft 20 for rotation therewith. A hydraulic pump-motor 14 is in fluid connection with the annular hydraulic cylinder 34 to selectably pressurize a hydraulic fluid in the annular hydraulic cylinder 34.

A first elastomeric seal 38 is disposed in a first groove 39 defined in the annular hydraulic piston 36 to create a slidable seal between an outer diameter 37 of the annular hydraulic piston 36 and the annular hydraulic cylinder 34. A second elastomeric seal 40 is disposed in a second groove 41 defined in the annular hydraulic piston 36 to create a slidable seal between an inner diameter 43 of the annular hydraulic piston 36 and the annular hydraulic cylinder 34. A first thrust bearing 42 is disposed between the annular hydraulic piston 36 and the multiplate clutch pack 49 to transmit an engagement force from the annular hydraulic piston 36 to the multiplate clutch pack 49. A reaction thrust bearing 62 is disposed between the multiplate clutch pack 49 and the clutch housing 17 to react the engagement force and reduce friction between the multiplate clutch pack 49 and the clutch housing 17.

An example of operation of the example of the clutch depicted in FIG. 4 follows: When an engagement command is given, the hydraulic pump-motor 14 draws some of the hydraulic fluid from a sump 35 within clutch housing 17 and pressurizes the hydraulic cylinder 34 to maintain an engagement pressure against annular piston 36. The hydraulic pump-motor 14 may draw fluid from a filtered basin within the sump 35. Therefore, the annular piston 36 exerts a force onto the stack of first clutch plates 44 and second clutch plates 46 causing them to frictionally engage each other. When torque from the friction becomes high enough, the shafts rotate together and allow torque to be transferred therebetween.

In an example, the hydraulic pump-motor 14 may draw about 50 A (Amps) peak and 12 A-18 A nominal. In other examples the hydraulic pump-motor 14 may draw from about 20 A to about 75 A peak and from about 5 A to about 25 A nominal. It is to be understood that the current draw may depend on the operating hydraulic pressure.

In examples, the clutch plates 44 and 46 may rotate together when compressed with a force provided by hydraulic pump-motor 14 supplying fluid into annular hydraulic cylinder 34 pressing against annular piston 36. In some examples, the clutch plates 44 and 46 may be allowed to slip for a time. Slipping the clutch plates 44 and 46 may allow for smooth engagements when the plates 44 and 46 initially rotate at different speeds. For example, a difference in the speed of the first clutch plates 44 and the second clutch plates 46 may be greater than about 50 RPM. In examples, the difference in the speed of the first clutch plates 44 and the second clutch plates 46 may range from about zero (vehicle stand still, motor off) to greater than about 200 RPM. In examples of the clutch assembly 13, because of the ability to slip the clutch, engagement may occur with greater than about a 50 RPM difference in speeds across the clutch plates 44 and 46 without disrupting smoothness of the engagement. As such, there may be a lower NVH (noise, vibration and harshness) potential during engagement in examples having the clutch assembly 13 compared to a dog clutch (described in more detail below).

In examples of the present disclosure, the time to engage the clutch assembly 13 after the signal is sent to the clutch assembly 13 ranges from about 40 ms (milliseconds) to about 150 ms. In other examples, the engagement time ranges from about 25 ms to about 300 ms. It is to be understood that the signal may be sent to the clutch assembly 13 from an electronic control unit.

A vehicle with the clutch assembly 13 may be capable of "shift on the fly" without a special speed control in the clutch assembly 13 because of the ability to slip the clutch plates 44 and 46 and thereby operate smoothly with a relatively large difference in speeds between the clutch plates.

Thrust bearing 42 provides for rotation of the clutch plates 44 and 46 and reaction for thrust supplied by the annular piston 36. Clutch pack housing 48 is axially supported by thrust bearing 62 to rotate about the intermediated shaft 22 and move relative to cover 60. Cover 60 is fixedly attached using cover snap ring 56 engaging a complementary groove in clutch housing 17. The cover 60 cooperates with intermediate shaft seal 54 and cover seal 58 to enclose clutch assembly 13.

In examples of the present disclosure, a bi-directional piston (not shown) may be used to reduce viscous clutch drag when the clutch assembly 13 is disengaged.

Figure 5:
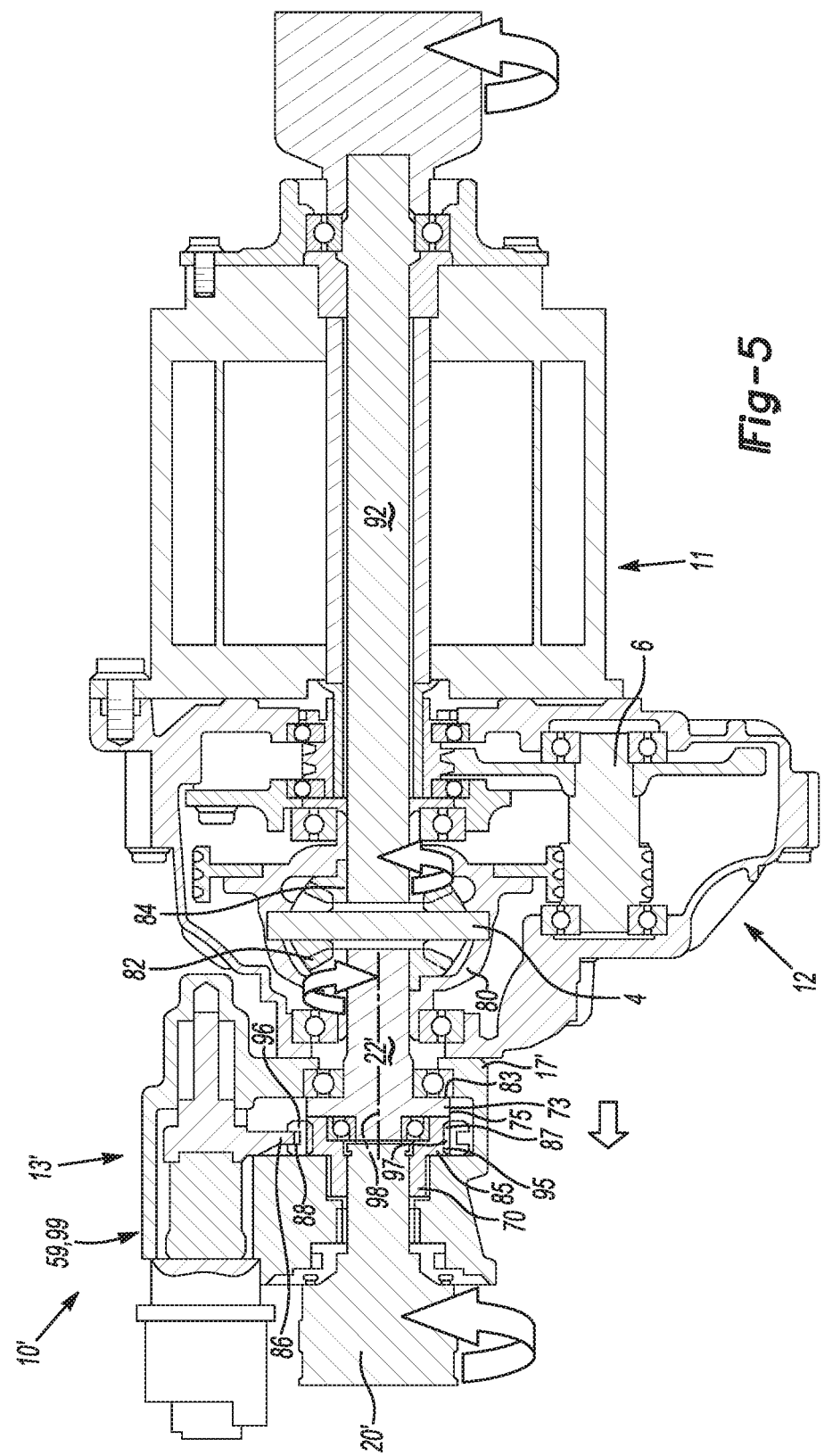
FIG. 5 is a semi-schematic top cross-sectional view of an example of an axle assembly depicting a clutch assembly with a disengaged dog clutch according to an example of the present disclosure.

FIG. 5 depicts a cross section of a drive system 10' wherein some features of drive system 10 discussed above are in common with drive system 10'. The clutch 13' includes a clutch housing to attach to a transmission-differential housing 71 attached to the motor 11. A first dog clutch flange 73 is disposed within the clutch housing 17' on the intermediate shaft 22. The first dog clutch flange 73 has a first outer diameter 75. A plurality of first external splines 83 are defined on the first dog clutch flange 73. A second dog clutch flange 85 is disposed within the clutch housing 17' on the other output shaft 20'. The second dog clutch flange 85 has a second outer diameter 87 substantially equal to the first outer diameter 75. A plurality of second external splines 95 are defined on the second dog clutch flange 85.

A sliding gear 96 has internal splines 97 complementary to the first external splines 83 and the second external splines 95. The sliding gear 96 is rotationally fixed to the second dog clutch flange 85 for rotation therewith. The sliding gear 96 is slidable along an axis of rotation 98. The axis of rotation 98 is common for the intermediate shaft 22 and the other output shaft 20'. The sliding gear 96 has an engaged position bridging the first dog clutch flange 73 and the second dog clutch flange 85 to selectably fix the intermediate shaft 22 and the other output shaft 20' to rotate together (see FIG. 6). As shown in FIG. 5, the sliding gear 96 has a disengaged position opposite the engaged position to selectably decouple the intermediate shaft 22 from the other output shaft 20' to allow the intermediate shaft 22 to rotate independently from the other output shaft 20'.

In the example depicted in FIG. 5, the actuator 59 is an electromagnetic linear actuator 99 attached to the clutch housing 17' and connected to the sliding gear 96 to selectably urge the sliding gear 96 to the engaged position when the electromagnetic linear actuator 99 is electrically energized. In an example, the electromagnetic linear actuator 99 may be an electromagnetic solenoid actuator. In another example, the electromagnetic linear actuator 99 may be a ball-screw actuator driven by an electric motor.

A shift fork 86 engages an external circumferential groove 88 in the sliding gear 96 to selectably urge the sliding gear 96 to the engaged position (see FIG. 6) when the electromagnetic linear actuator 99 is electrically energized.

In an example in which the electromagnetic linear actuator 99 is an electromagnetic solenoid actuator, the solenoid actuator may draw from about 10 A to about 20 A peak and from about 3 A to about 4 A nominal. In other examples, the solenoid actuator may draw from about 3 A to about 20 A peak and from about 1 A to about 10 A nominal. The clutch assembly 13' shown in FIG. 5 is in a disconnected state (disengaged position) as compared to FIG. 6 which provides a view of a connected state (engaged position) of clutch assembly 13'. Although the clutch assembly 13' depicted in FIG. 5 and FIG. 6 has splines on the circumference of the flanges 73 and 85, a face dog clutch (not shown) may be used in place of the spline clutch depicted.

FIG. 5 further depicts an example of a transmission-differential assembly 12 detailed in the discussion of FIG. 1C above. Side gear 82 is splined to intermediate shaft 22' and side gear 84 is splined to output shaft 92. In the disconnected state shown in FIG. 5, there is substantially no torque load on the intermediate shaft 22'. If the motor 11 is not rotating, then the differential case 80 will not rotate since the two are connected by the gear train 91. FIG. 5 depicts the intermediate shaft 22' and the output shaft 92 rotating in opposite directions, which would occur when the motor 11 is not rotating, and the output shaft 92 is rotating with the road wheel 66' (see FIG. 1B).

The drive system 10' depicted in FIG. 5 may be controlled to produce smooth driveline operation. In an example, the motor 11 may be used to match an intermediate shaft 22' speed to road wheel 66 speed prior to engagement to allow smooth engagement while the vehicle is in motion. For smooth engagement, the speed of the intermediate shaft 22 may be within about 50 RPM of the road wheel 66 speed before engagement. In an example, wheel speed sensors (not shown) may be used in determining the speeds of road wheel 66 and road wheel 66'. In other examples, wheel speed may be inferred or calculated. In examples of the present disclosure, the clutch assembly 13' may be smoothly engaged when the vehicle is at substantially zero speed.

In an example, wiring for the clutch assembly 13' may have a maximum of 2 conductors as long as the wheel speed sensors are already wired into the vehicle separately.

In examples of the present disclosure depicted in FIG. 5, the time to engage the clutch assembly 13' after the signal is sent to the clutch assembly 13' may be less than 200 ms. In other examples, the engagement time ranges from about 100 ms to about 300 ms.

Figure 6:
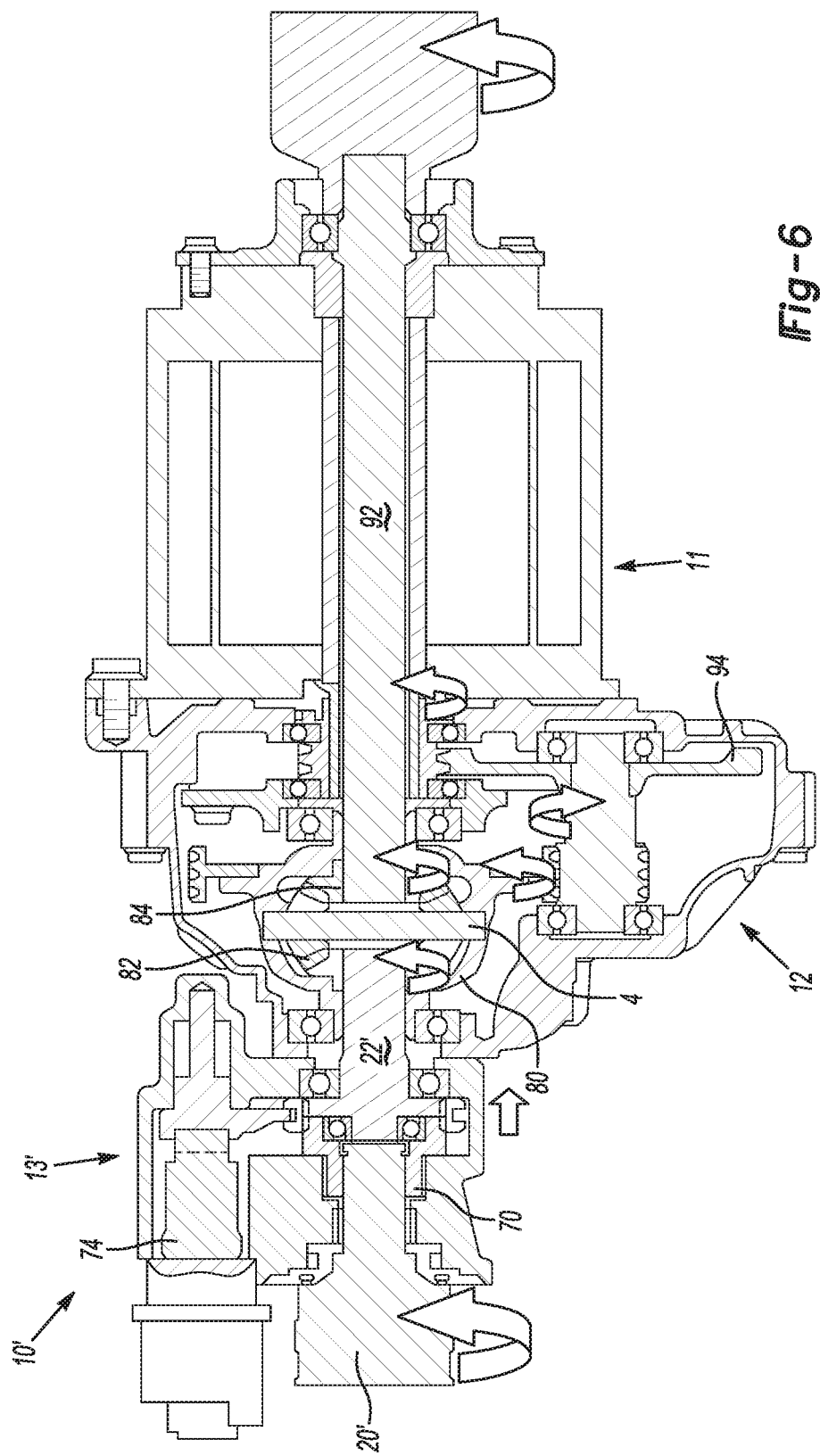
FIG. 6 is a semi-schematic top cross-sectional view of the axle assembly depicted in FIG. 5 showing the dog clutch engaged according to an example of the present disclosure.

FIG. 6 provides a view of drive system 10' with clutch assembly 13' in its connected state and electric motor 11 operating. Electric motor 11 drives reducing gear 94 which in turn drives differential case 80 and differential pinion shaft 4 which cooperates with side gears 82 and 84 to provide output rotation to intermediate shaft 22' and output shaft 92. Since the clutch 13' is in the engaged state in FIG. 6, the intermediate shaft 22' is connected to the other output shaft 20' for rotation therewith.

Figure 7:
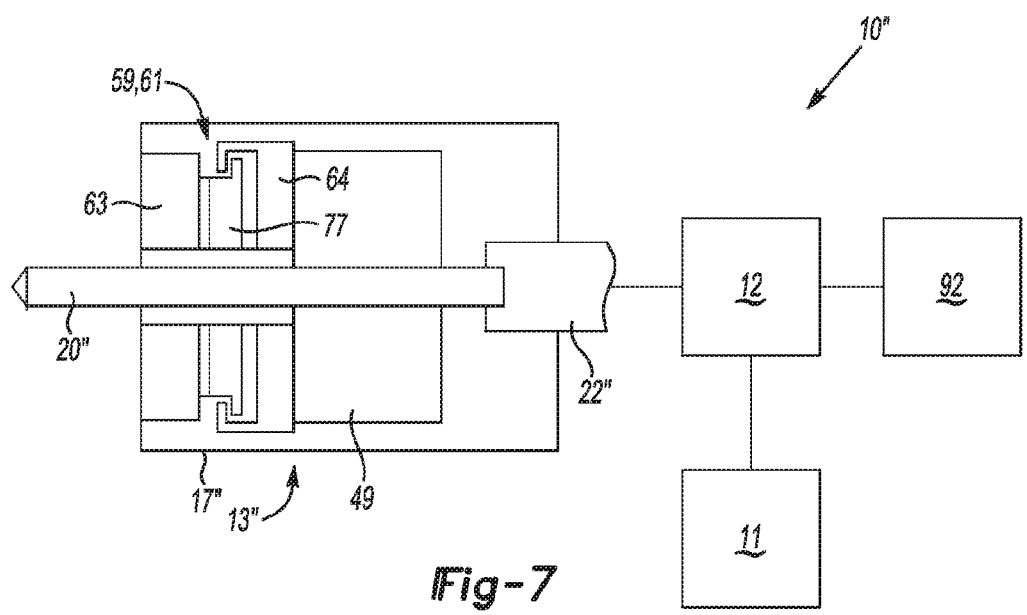
FIG. 7 is a schematic diagram of an example of a clutch assembly with a ball ramp mechanism according to an example of the present disclosure.

FIG. 7 depicts a drive system 10" with a clutch assembly 13". In the example depicted in FIG. 7, the actuator 59 is an annular electromagnetic ball ramp actuator 61 disposed in the clutch housing 17". The annular electromagnetic ball ramp actuator 61 is connected axially to the multiplate clutch pack 49 to selectably generate a clutch engaging force on the multiplate clutch pack 49 when the electromagnetic ball ramp actuator 59 is electrically energized.

In the example depicted in FIG. 7, the annular electromagnetic ball ramp actuator 61 includes a solenoid coil 63 fixedly mounted to the clutch housing 17" within the clutch housing 17" and surrounding the other output shaft 20". An annular ball ramp mechanism 64 is disposed within the clutch housing 17" connected axially to the multiplate clutch pack 49. A clutch armature 77 is disposed between the solenoid coil 63 and the ball ramp mechanism 64 to be magnetically drawn toward the solenoid coil 63 when the solenoid coil 63 is electrically energized. Drawing the clutch armature 77 toward the solenoid coil 63 induces a retarding torque on the ball ramp mechanism 64. The retarding torque on the clutch mechanism 64 is to cause the ball ramp mechanism 64 to apply the clutch engaging force to the multiplate clutch pack 49.

In an example, the solenoid coil 63 may draw about 10 A peak and from about 3 A to about 4 A nominal. In other examples the solenoid coil 63 may draw from about 3 A to about 20 A peak and from about 1 A to about 10 A nominal. The clutch assembly 13" could be used as in an on/off mode. The clutch assembly 13" may also be used in a progressive engagement mode. As used herein, a progressive engagement mode means the clutch is allowed to slip and gradually match the speeds of the clutch plates 44, 46 (see FIG. 4). In examples of the clutch assembly 13", because of the ability to slip the clutch, engagement may occur with greater than about a 50 RPM difference in speeds across the clutch without disrupting smoothness of the engagement. The clutch assembly 13" depicted in FIG. 7 does not require any special controls to allow "Shift on the fly".

Because there is a ball ramp, the clutch assembly 13" may use shaft rotation to produce full engagement. In examples of the present disclosure, the time to engage the clutch assembly 13" after a signal is sent to clutch assembly 13" may be less than 200 ms. In other examples, the engagement time may range from about 100 ms to about 300 ms. It is to be understood that engagement time of the clutch assembly 13" may depend on the speeds of the output shaft 92 and the other output shaft 20".

In an example, wiring for the clutch assembly 13" may have a maximum of 2 conductors as long as the wheel speed sensors are already wired into the vehicle separately.

In some examples of the clutch assembly 13", viscous clutch drag in the nominally disengaged state may be reduced using return springs (not shown).

Figure 8:
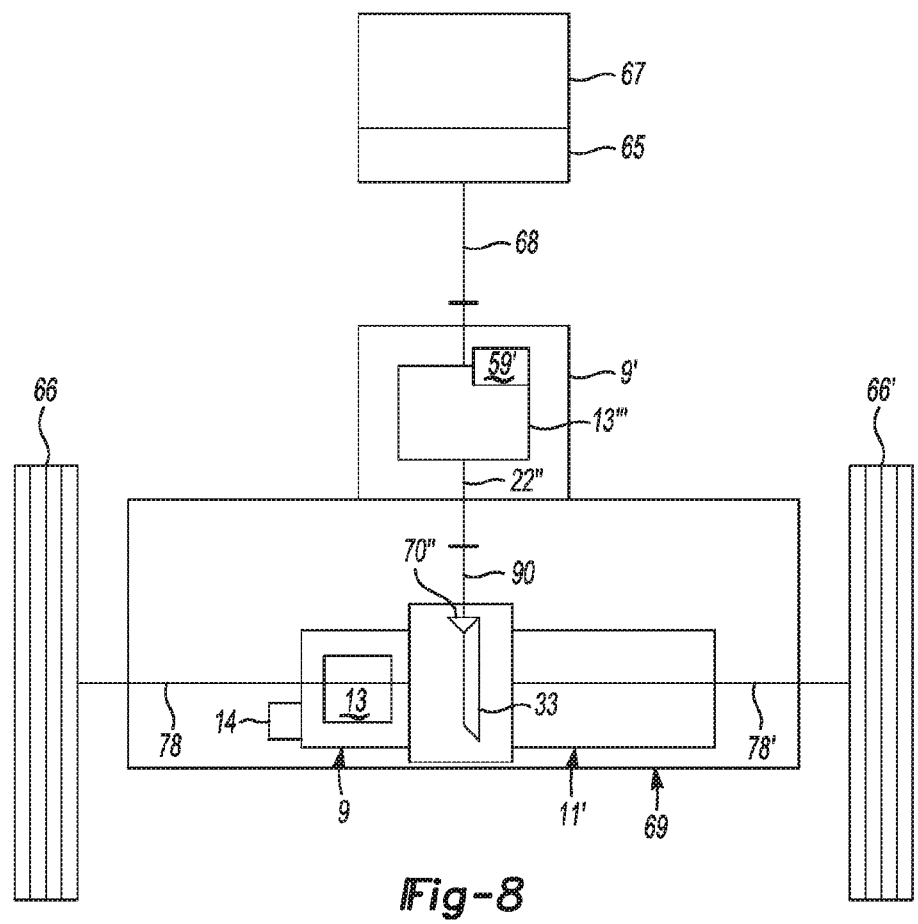
FIG. 8 is a schematic diagram of an example of a clutch system to selectably connect a vehicle rear axle to an internal combustion engine according to an example of the present disclosure.

FIG. 8 depicts a clutch system 9' to selectably connect a vehicle rear axle 69 to an internal combustion engine 67. The clutch system 9' includes an intermediate shaft 22" to selectably attach to a vehicle driveline prop shaft 68 connected through a transmission 65 to the engine 67 for rotation therewith. The intermediate shaft 22" is fixed to a driveshaft 90 for rotation therewith. The driveshaft 90 has a drive pinion 70" fixed to the driveshaft 90 for rotation therewith. The drive pinion 70" engages a ring gear 33 to drive the rear axle 69. A clutch 13''' is disposed on the rear axle 69 to selectably connect the intermediate shaft 22" to the prop shaft 68. An actuator 59' is to selectably actuate the clutch 13''' to an engaged state. In the engaged state, the clutch 13''' selectably connects the intermediate shaft 22" to the prop shaft 68. The prop shaft 68 and the rear axle shafts 78, 78' may rotate independently when the clutch 13''' is not in the engaged state. The rear axle shafts 78, 78' are to be powered by an electric motor 11' mounted on the rear axle 69. The rear axle 69 is to be selectably connected by the clutch 13''' to the engine 67. Therefore the rear axle 69 may be selectably powered by the engine 67, the electric motor 11', or both at the same time. It is to be understood that the clutch system 9' is mounted on the rear axle 69, and is in addition to any clutches that may be associated with the transmission 65.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from about 25 ms to about 300 ms should be interpreted to include not only the explicitly recited limits of about 25 ms to about 300 ms, but also to include individual values, such as 35 ms, 82 ms, 225 ms, etc., and sub-ranges, such as from about 50 ms to about 250 ms, etc. Furthermore, when "about" is utilized to describe a value, this is meant to encompass minor variations (up to +/−10%) from the stated value.

While multiple examples have been described in detail, it will be apparent to those skilled in the art that the disclosed examples may be modified. Therefore, the foregoing description is to be considered non-limiting.

What is claimed is:

1. A clutch system to selectably connect a vehicle rear axle to a motor, comprising:
    an intermediate shaft to fixably attach to a side gear of a differential for rotation therewith, wherein:
        a case of the differential is connected to the motor via a gear train;
        an other side gear of the differential is affixed to an output shaft; and
        the output shaft extends through a center of rotation of an armature of the motor to connect to a road wheel of a vehicle;
    a clutch to selectably connect the intermediate shaft to an other output shaft connected to an other road wheel of the vehicle, wherein the clutch includes:
        a clutch housing to attach to a transmission-differential housing attached to the motor; and
        a mulitplate clutch pack rotatably disposed in the clutch housing, wherein the multiplate clutch includes:
            a clutch pack housing having a hub with a first splined connection to the intermediate shaft;
            a plurality of first clutch plates disposed in the clutch pack housing wherein the plurality of first clutch plates have internal engagement features to engage the other output shaft with a second splined connection; and
            a plurality of second clutch plates disposed alternatingly with the plurality of first clutch plates in the clutch pack housing wherein the plurality of second clutch plates have external engagement features to engage the clutch pack housing by a third splined connection; and
    an actuator to selectably actuate the clutch to an engaged state and thereby selectably connect the intermediate shaft to the other output shaft wherein the output shaft, the other output shaft, and the motor rotate independently when the clutch is not in the engaged state.

2. The clutch system as defined in claim 1 wherein:
    the clutch housing includes:
        an annular hydraulic cylinder defined in the clutch housing surrounding the other output shaft; and
        an annular hydraulic piston slidingly disposed in the annular hydraulic cylinder connected axially to the multiplate clutch pack to selectably generate a clutch engaging force on the multiplate clutch pack wherein the hydraulic piston is the actuator; and
    a hydraulic pump-motor is in fluid connection with the hydraulic cylinder to selectably pressurize a hydraulic fluid in the annular hydraulic cylinder.

3. The clutch system as defined in claim 2 wherein:
    an interior end of the other output shaft is nested in a cylindrical pocket defined at a clutch end of the intermediate shaft with a roller bearing disposed between an outer circumferential surface of the other output shaft and an interior surface of the cylindrical pocket to support the other output shaft for coaxial selectably independent rotation with the intermediate shaft;
    an outer ball bearing and an inner ball bearing are disposed in the clutch housing to support the other output shaft for rotation relative to the clutch housing;
    a first elastomeric seal is disposed in a first groove defined in the annular hydraulic piston to create a slidable seal between an outer diameter of the annular hydraulic piston and the annular hydraulic cylinder;
    a second elastomeric seal is disposed in a second groove defined in the annular hydraulic piston to create a slidable seal between an inner diameter of the annular hydraulic piston and the annular hydraulic cylinder;
    a first thrust bearing is disposed between the annular hydraulic piston and the multiplate clutch pack to transmit an engagement force from the annular hydraulic piston to the multiplate clutch pack; and
    a reaction thrust bearing is disposed between the multiplate clutch pack and the clutch housing to react the engagement force and reduce friction between the clutch pack and the clutch housing.

4. The clutch system as defined in claim 2 wherein the hydraulic pump-motor is a brushless direct current motor (BLDC).

5. The clutch system as defined in claim 2 wherein the hydraulic pump-motor is a 12V (Volt) standard direct current motor.

6. The clutch system as defined in claim 1 wherein the actuator is an annular electromagnetic ball ramp actuator disposed in the clutch housing connected axially to the multiplate clutch pack to selectably generate a clutch engaging force on the multiplate clutch pack when the electromagnetic ball ramp actuator is electrically energized.

7. The clutch system as defined in claim 6 wherein the annular electromagnetic ball ramp actuator includes:
    a solenoid coil fixedly mounted to the clutch housing within the clutch housing and surrounding the other output shaft;
    an annular ball ramp mechanism disposed within the clutch housing connected axially to the multiplate clutch pack; and
    a clutch armature disposed between the solenoid coil and the ball ramp mechanism to be magnetically drawn toward the solenoid coil when the solenoid coil is electrically energized thereby to induce a retarding torque on the ball ramp mechanism thereby to cause the ball ramp mechanism to apply the clutch engaging force to the multiplate clutch pack.

8. A clutch system to selectably connect a vehicle rear axle to a motor, comprising:
    an intermediate shaft to fixably attach to a side gear of a differential for rotation therewith, wherein:
        a case of the differential is connected to the motor via a gear train;
        an other side gear of the differential is affixed to an output shaft; and the output shaft extends through a center of rotation of an armature of the motor to connect to a road wheel of a vehicle;

a clutch to selectably connect the intermediate shaft to an other output shaft connected to an other road wheel of the vehicle, wherein the clutch includes:

a clutch housing to attach to a transmission-differential housing attached to the motor;

a first dog clutch flange disposed within the clutch housing on the intermediate shaft wherein the first dog clutch flange has a first outer diameter;

a plurality of first external splines defined on the first dog clutch flange;

a second dog clutch flange disposed within the clutch housing on the other output shaft wherein the second dog clutch flange has a second outer diameter substantially equal to the first outer diameter;

a plurality of second external splines defined on the second dog clutch flange; and a sliding gear having internal splines complementary to the first external splines and the second external splines, wherein:

the sliding gear is rotationally fixed to the first dog clutch for rotation therewith;

the sliding gear is slidable along an axis of rotation;

the axis of rotation is common for the intermediate shaft and the other output shaft;

the sliding gear has an engaged position bridging the first dog clutch flange and the second dog clutch flange to selectably fix the intermediate shaft and the other output shaft to rotate together; and the sliding gear has a disengaged position opposite the engaged position to selectably decouple the intermediate shaft from the other output shaft to allow the intermediate shaft to rotate independently from the other output shaft; and an actuator to selectably actuate the clutch to an engaged state and thereby selectably connect the intermediate shaft to the other output shaft, wherein:

the output shaft, the other output shaft, and the motor rotate independently when the clutch is not in the engaged state;

the actuator is an electromagnetic linear actuator attached to the clutch housing and connected to the sliding gear to selectably urge the sliding gear to the engaged position when the electromagnetic linear actuator is electrically energized; and a shift fork engages an external circumferential groove in the sliding gear to selectably urge the sliding gear to the engaged position when the electromagnetic linear actuator is electrically energized.

9. The clutch system as defined in claim 8 wherein the electromagnetic linear actuator is an electromagnetic solenoid actuator.

10. The clutch system as defined in claim 8 wherein the electromagnetic linear actuator is a ball-screw actuator driven by an electric motor.

11. A clutch system to selectably connect a vehicle rear axle to an internal combustion engine, comprising:

an intermediate shaft to fixably attach to a vehicle driveline prop shaft connected through a transmission to the engine for rotation therewith;

a driveshaft having a drive pinion fixed to the driveshaft for rotation therewith wherein the drive pinion engages a ring gear to drive the rear axle;

a clutch disposed on the rear axle to selectably connect the intermediate shaft to the driveshaft; and an actuator to selectably actuate the clutch to an engaged state and thereby selectably connect the intermediate shaft to the driveshaft wherein the prop shaft and the rear axle rotate independently when the clutch is not in the engaged state and wherein the rear axle is to be powered by an electric motor mounted on the rear axle and to be selectably connected by the clutch to the engine.

12. A vehicle rear axle, comprising:

a transmission-differential assembly attached to an electric motor housing of an electric motor;

an intermediate shaft rotatably disposed through an aperture defined in a transmission-differential housing of the transmission-differential assembly;

an output shaft extending opposite to the intermediate shaft and coaxial therewith through an other aperture in the transmission-differential housing through a center of rotation of an armature of the electric motor to connect to a road wheel of a vehicle;

a clutch to selectably connect the intermediate shaft to an other output shaft connected to an other road wheel of the vehicle; wherein the clutch includes:

a clutch housing to attach to a transmission-differential housing attached to the motor; and a mulitplate clutch pack rotatably disposed in the clutch housing, wherein the multiplate clutch includes:

a clutch pack housing having a hub with a first splined connection to the intermediate shaft;

a plurality of first clutch plates disposed in the clutch pack housing wherein the plurality of first clutch plates have internal engagement features to engage the other output shaft with a second splined connection; and a plurality of second clutch plates disposed alternatingly with the plurality of first clutch plates in the clutch pack housing wherein the plurality of second clutch plates have external engagement features to engage the clutch pack housing by a third splined connection; and an actuator to selectably actuate the clutch to an engaged state and thereby selectably connect the intermediate shaft to the other output shaft wherein the output shaft, the other output shaft, and the motor rotate independently when the clutch is not in the engaged state.

13. The vehicle rear axle as defined in claim 12 wherein the transmission-differential assembly includes:

a differential assembly disposed in the transmission-differential housing having:

a differential case to rotate about an axis of rotation;

a ring gear fixed to the differential case to rotate coaxially therewith;

a reducing gear intermeshed with an electric drive motor output pinion;

a layshaft fixed to the reducing gear for rotation therewith; and a layshaft pinion fixed to the layshaft for rotation therewith wherein the layshaft pinion is meshingly engaged with the ring gear.

* * * * *